United States Patent [19]

Odaka et al.

[11] Patent Number: 5,012,459
[45] Date of Patent: Apr. 30, 1991

[54] DATA RECORDER

[75] Inventors: Kentaro Odaka, Tokyo; Shinya Ozaki, Kanagawa; Masaki Yamada, Kanagawa; Yoshizumi Inazawa, Kanagawa; Hiroshi Ishibashi, Kanagawa, all of Japan

[73] Assignee: Sony Corporation, Tokyo, Japan

[21] Appl. No.: 536,074

[22] Filed: Jun. 11, 1990

Related U.S. Application Data

[63] Continuation of Ser. No. 210,229, Jun. 23, 1988, abandoned.

[30] Foreign Application Priority Data

Jun. 29, 1987 [JP] Japan ................... 62-161924

[51] Int. Cl.[5] ............................................. G11B 5/09
[52] U.S. Cl. ................................... 360/32; 360/48
[58] Field of Search ......................................... 360/32

[56] References Cited

U.S. PATENT DOCUMENTS 4,604,657  8/1986  Fukami et al. .
4,772,963  9/1988  Van Lahr .................... 360/47
4,812,924  3/1989  Fukami et al. .................... 360/48

FOREIGN PATENT DOCUMENTS 0155101   9/1985  European Pat. Off. .
0205181  12/1986  European Pat. Off. .
0272130   6/1988  European Pat. Off. .
2574974   6/1986  France .
2168512A  6/1986  United Kingdom .

Primary Examiner—Vincent Canney
Attorney, Agent, or Firm—Philip M. Shaw., Jr.

[57] ABSTRACT

Digital data is formatted and recorded in track pairs on a tape by the rotary heads of a DAT so as to have a header portion for each track which includes a frame number, error correcting code, ID and so on added to the digital data, the content of each header portion of the tracks for any given frame being equal whereby it is possible to easily detect, upon reproduction, unerased data signals due to head clogging and so on by comparing portions of the two header portions of each frame and error correcting the data from those tracks where it is determined that the compared header portions contain different data.

20 Claims, 9 Drawing Sheets

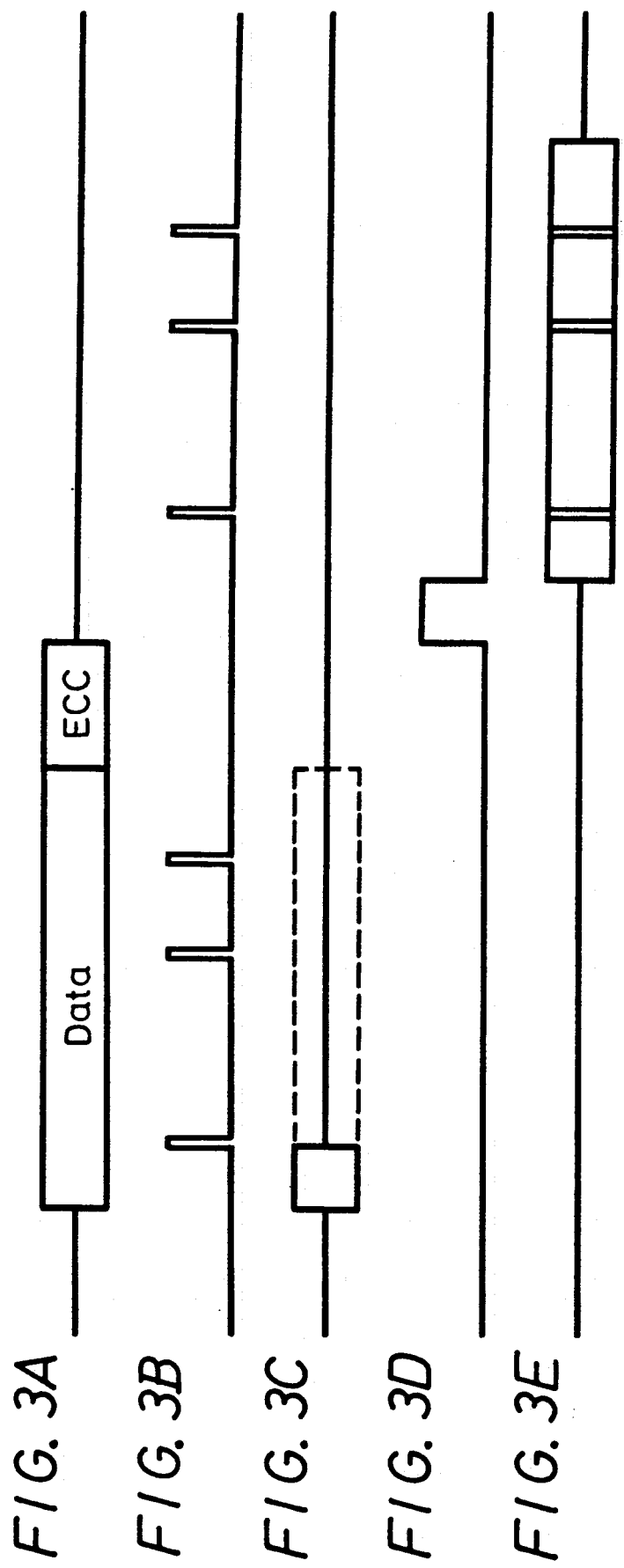

FIG. 5A

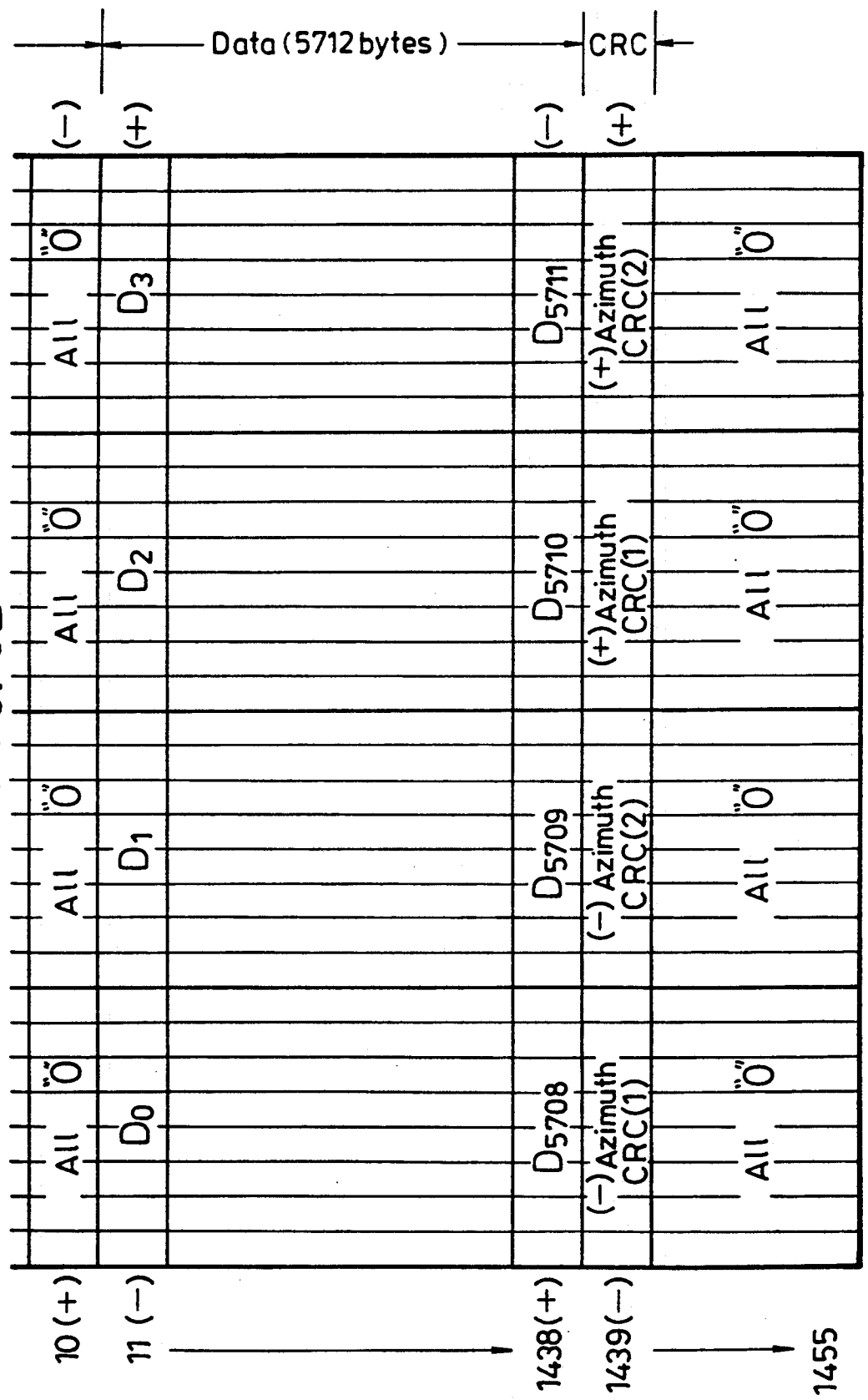

FIG. 6A

First Pack

| | MSB | | | | | | | LSB |
|---|---|---|---|---|---|---|---|---|
| 1st Word | 0 | 0 | 0 | 1 | 0 | Format ID | | |
| 2nd Word | Area | | ID | VF | | Frame ID | | |
| 3rd Word | | | F | N | O | (1) | | |
| 4th Word | | | F | N | O | (2) | | |
| 5th Word | | | F | N | O | (3) | | |
| 6th Word | | S | S | N | O | (1) | | |
| 7th Word | | S | S | N | O | (2) | | |
| 8th Word | | | | Parity | | | | |

FIG. 6B

Second Pack

| | MSB | | | | | | | LSB |
|---|---|---|---|---|---|---|---|---|
| 1st Word | 0 | 0 | 1 | 0 | 0 | Format ID | | |
| 2nd Word | Area | | ID | VF | | Frame ID | | |
| 3rd Word | | A | F | N | O | (1) | | |
| 4th Word | | A | F | N | O | (2) | | |
| 5th Word | | A | F | N | O | (3) | | |
| 6th Word | | | | All | | "0" | | |
| 7th Word | | | | All | | "0" | | |
| 8th Word | | | | Parity | | | | |

FIG. 9A

| W1 (DATA-ID) 8bit | | W2 (Block Address) 8bit | | | | | | | | |
|---|---|---|---|---|---|---|---|---|---|---|
| ID-0 | ID-1 Frame Address | 0 | X | X | X | 0 | 0 | 0 | 0 | 0 |
| Optional Code | | 0 | | | ← | 0 | 0 | 0 | 0 | 1 |
| ID-2 | ID-3 Frame Address | 0 | | | ← | 0 | 0 | 1 | 1 | 0 |
| Optional Code | | 0 | | | ← | 0 | 0 | 1 | 1 | 1 |
| ID-4 | ID-5 Frame Address | 0 | | | ← | 0 | 1 | 0 | 0 | 0 |
| Optional Code | | 0 | | | ← | 0 | 1 | 0 | 1 | 0 |
| ID-6 | ID-7 Frame Address | 0 | | | ← | 0 | 1 | 1 | 1 | 0 |
| Optional Code | | 0 | | | | 0 | 1 | 1 | 1 | 1 |

FIG. 9B

| SUB-CODE ID | | | W2 (8bit) | |
|---|---|---|---|---|
| W1 (8bit) | | | | |
| Validity | Location | Frame Filemark | | Block Address |
| 0 | 0 0 0 | 0 * * 0 | 1 0 0 0 | X X X |

DATA RECORDER

This is a continuation of co-pending application Ser. No. 7/210,229 filed on June 23, 1988, now abandoned.

BACKGROUND OF THE INVENTION

1. Field of the Invention

This invention relates generally to a method and apparatus for recording and/or reproducing digital data. More particularly, the present invention relates to a rotary head type digital audio tape recorder (R-DAT) when used for recording data from a computer or the like.

2. Description of the Prior Art

In order to protect computer generated data written on a hard disc or the like, the data are sometimes transferred to a so-called data streamer (or data recorder) and are thereby recorded (or backed up) on other recording media once per day.

In most cases, a conventional data streamer is what might be called an analog audio tape recorder. Such an analog audio tape recorder, however, consumes a great quantity of the recording medium (i.e. tape). Also, such a conventional data streamer has a low data rate upon recording so that it takes a lot of time for transferring and recording the data. Further, it is not easy for the analog audio tape recorder to find out the starting point of the desired recorded data.

When data, for example, from a computer is recorded by the use of a conventional audio tape recorder, an arbitrary file mark signal is supplied thereto from the computer. Upon reproduction, the location number of the file mark for the computer designated address is searched for. Since the conventional analog audio tape recorder is so arranged as to search for the location number of the file mark by counting the reproduced signal of the file mark in the normal reproduction operation, it takes a long time to search for the desired file mark. Thus, it is difficult to search for the location number of the file mark.

A DAT (digital audio tape recorder) has been developed, as described in "ES Review", pp. 11 to 14, published on December, 1985 by Sony Corporation, Shibaura Plant: ISSN 0389-7737. Since this DAT is designated so as to record and/or reproduce a digital signal that is a digitized audio signal, it is very suitable for recording the aforesaid data.

The assignee of the present application has proposed a data recorder using an R-DAT for computer in U.S. Patent Applications Ser. No. 133,010 filed Dec. 15, 1987 and Ser. No. 177,624 filed Apr. 5, 1988.

With a DAT as described above, when another signal is to be recorded on a previously recorded recording medium, previously recorded signals are erased by recording new signals over them, that is, by a so-called overwriting, without using an erasing head. Therefore, if overwriting is not normally effected, for example, due to clogging of the head, there is the possibility that a part of the previously recorded signals remains unerased.

To correct this problem, in the DAT format an error detecting code is added to each recording track so as to detect an unerased portion, if any, in the track as an error. However, even with such a code added to each track, if an entire track remains unerased no error is detected since the error detecting code within the unerased track is considered normal.

If the signal to be recorded is an audio signal, wherein adjacent data are correlated with each other due to the more or less continuous nature of an audio signal, a correction can be effected by an interpolation technique even though the remaining unerased signal portion is removed from the track. However, if the DAT is employed as a data recorder, wherein adjacent data are not generally correlated, the interpolation technique cannot be utilized.

The aforementioned U.S. Patent Application Ser. No. 177,624 filed Apr. 5, 1988 proposes a technique wherein, when the DAT is employed as a data recorder, an error correcting code is generated for a plurality of frames of data signals to be supplied to the DAT and the error correcting code thus generated is supplied to the DAT to be recorded on the tape, in the same manner as the data signals. Thus, error correction is effected outside the DAT, thereby providing the DAT with a powerful error correcting performance.

This error correcting operation requires that an erroneous frame has been detected prior to the error correcting operation. However, in the above-mentioned case where one or more tracks remain entirely unerased, the error cannot be detected by this method. Therefore, although the error correcting code is generated outside the DAT, errors cannot be corrected.

OBJECTS AND SUMMARY OF THE INVENTION

In view of the problems mentioned above, it is an object of the present invention to provide an improved method and apparatus for recording and/or reproducing digital data information.

It is another object of the present invention to provide a method and apparatus for recording and/or reproducing digital data information which employs a DAT.

It is a further object of the present invention to provide a highly reliable method and apparatus for recording and/or reproducing digital data information.

According to a first aspect of the present invention there is provided a method of recording digital data in a main data area in a series of track pairs on a recording medium comprising the steps of:

receiving digital information signals from an external source and dividing them into frames, each frame corresponding to a different pair of tracks to be recorded on the recording medium;

for each of the two tracks forming each frame, generating header portions, having identical contents, which are each arranged to be recorded before the digital information signals in the respective tracks, each header portion including a signal indicative of the type of source of the digital data signals. and recording the digital information signals and the header portions in the main data area in a series of pairs of tracks on the recording medium according to a predetermined DAT format.

According to a second aspect of the present invention there is provided a method of reproducing digital data signals recorded on a recording medium, wherein the digital data signals as recorded are formatted into frames, each frame corresponding to two tracks, with an identical header portion being provided at the beginning of each track forming one frame, it being intended that the digital data and the header portions of each frame are to be reproduced together, the method comprising the steps of:

reproducing the digital data signals recorded in the tracks on the recording medium;

separating the header portions from the reproduced digital data signals and comparing with each other at least parts of the header portions reproduced from the two tracks forming each frame;

determining that the digital data signals written in each frame are erroneous if the data in the parts of the header portions of the two tracks are not identical; and correcting the erroneous digital data signals of each frame by the use of an error correcting code.

According to a third aspect of the present invention there is provided an apparatus for recording digital data signals in a main data area in a series of track pairs on a recording medium comprising:

means for receiving digital information signals from an external source and dividing them into frames, each frame corresponding to a different pair of tracks to be recorded on the recording medium;

means for providing header portions for each of the two tracks forming each frame, the header portions having identical contents and each arranged to be recorded before the digital information signals in the respective and wherein the header portion each include a signal indicative of the type of source of the digital data signals; and means or recording the digital information signals and the header portions in the main data area in a series of pairs of tracks on the recording medium according to a predetermined, DAT format.

Further, according to a fourth aspect of the present invention there is provided an apparatus for reproducing digital data signals recorded on a recording medium wherein the recorded digital data signals are formatted by being divided into frames, each of which corresponds to two tracks, with each frame including a header portion which is identical in the respective two tracks forming each frame, comprising:

means for reproducing the digital data signals recorded in the tracks on the recording medium;

separating and comparing means for separating the header portions from the reproduced signals for each frame and comparing at least parts of the header portions reproduced from the two tracks forming each frame with each other;

means supplied with the results of the separating and comparing means for determining whether the digital data signals written in each frame are erroneous if the comparison result shows that data in the parts of the header portions of the two tracks are not identical; and error correcting means for correcting the erroneous digital data signals by the use of an error correcting code.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 3A to 3E are timing charts used for explaining the reproducing operation of the recording and/or reproducing apparatus shown in FIG. 1;

Figure 5A:
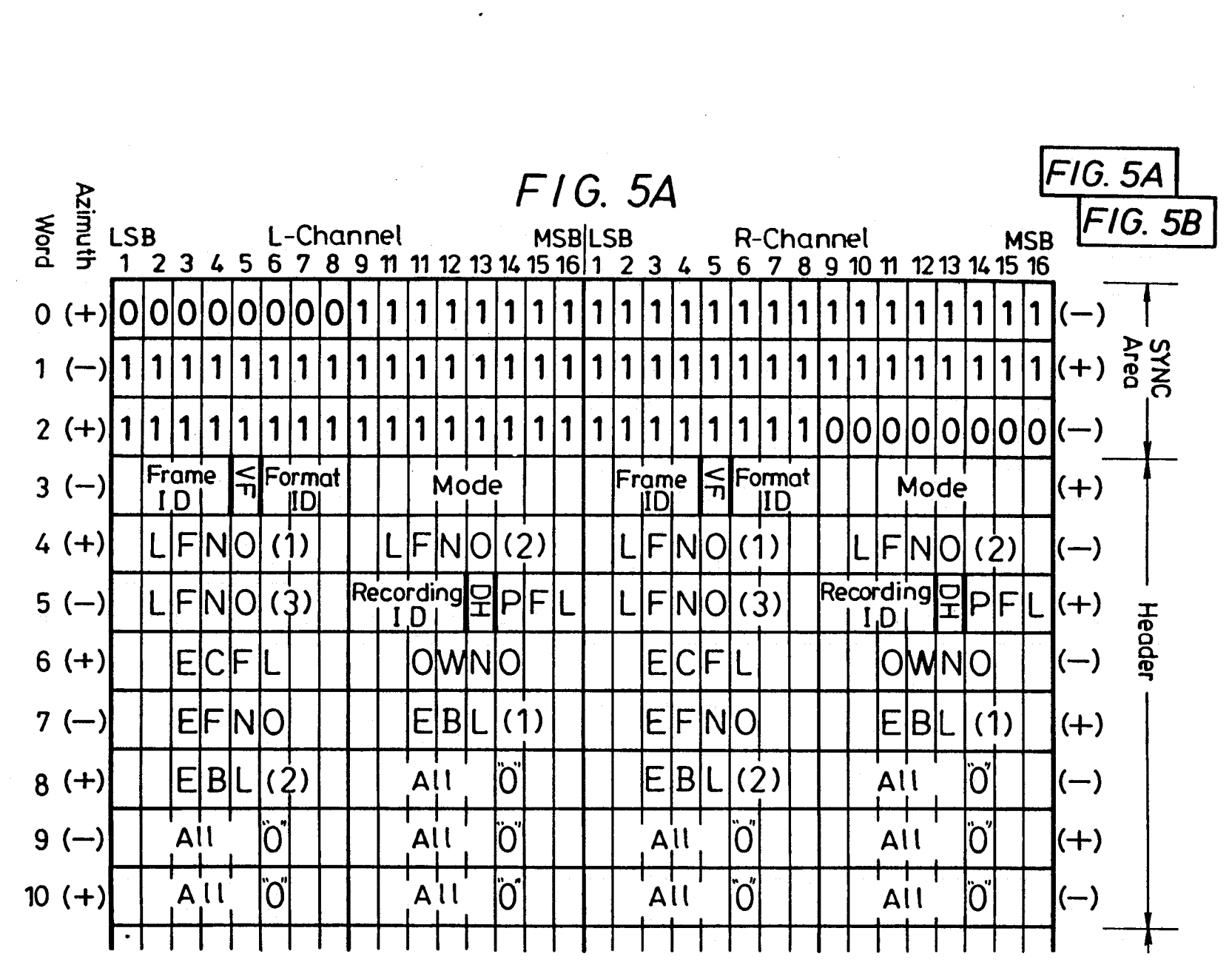

FIG. 5 (formed of FIGS. 5A and 5B on two separate sheets) is a diagram showing a data format in a main data area according to the present invention;

FIGS. 6A and 6B are tables showing the recording format of packs comprised in a sub-code area;

FIGS. 9A and 9B are diagrams showing the ID organization of a DAT format.

DESCRIPTION OF THE PREFERRED EMBODIMENT

An embodiment of the present invention will hereinafter be described with reference to the accompanying drawings.

Figure 1:
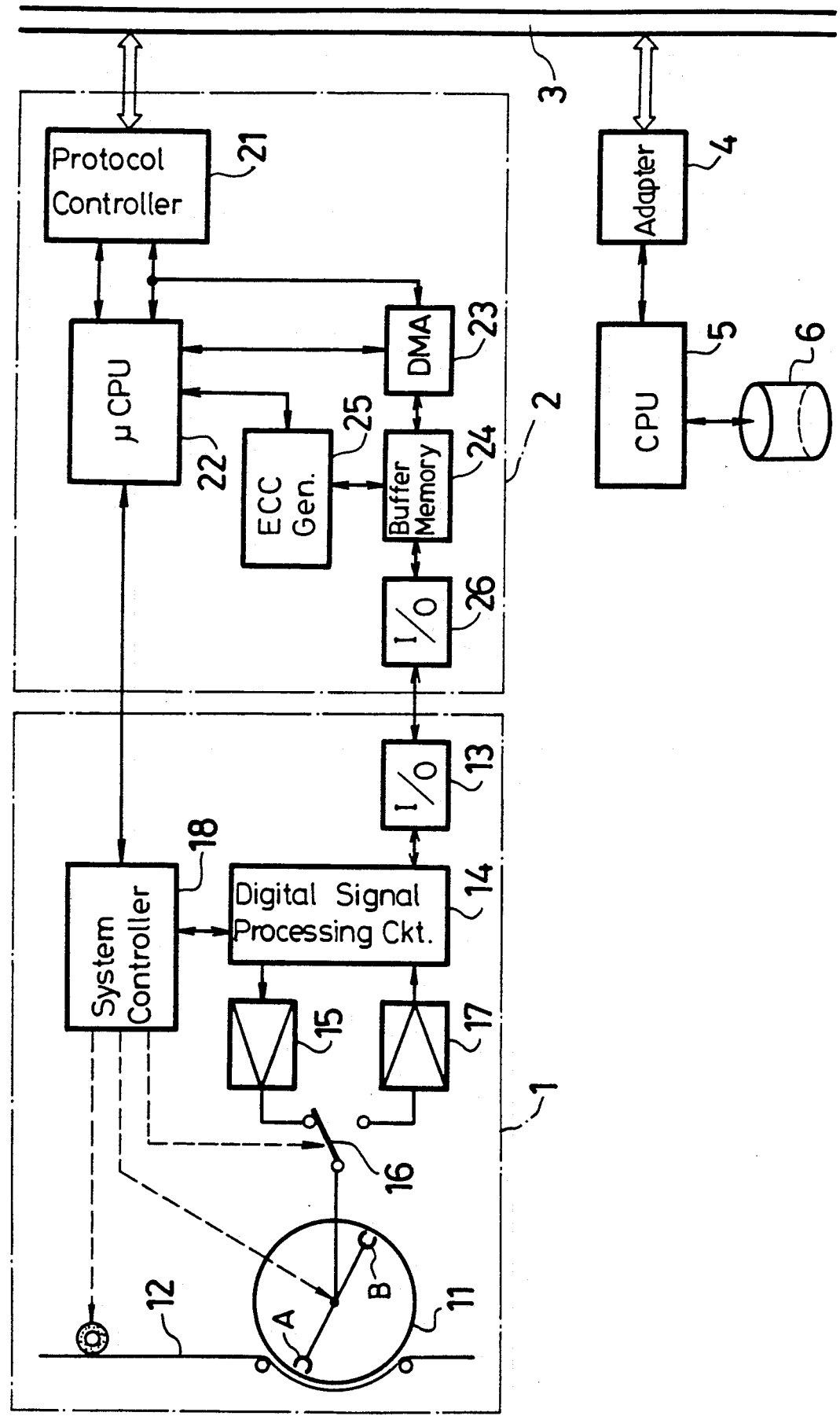
FIG. 1 is a circuit block diagram showing the whole arrangement of an embodiment of a recording and/or reproducing apparatus according to the present invention.

Referring initially to FIG. 1, the data recorder according to a first embodiment of the invention includes a digital audio tape recorder (DAT) 1. This digital audio tape recorder 1 is provided with a rotary head drum 11, and a magnetic tape 12 is wrapped around the peripheral surface of the rotary head drum 11, over an angular range of about 90. of head travel, and is transported past the head drum 11 by a tape transport mechanism 19. Two rotary heads A and B are mounted in the rotary head drum 11, and two skewed tracks are recorded and/or reproduced by the rotary heads A and B once per revolution of the rotary head drum 11 as shown more clearly in FIG. 4.

Incoming digital data is supplied to an I/O (input and output) circuit 13 of the DAT 1. The digital data from the I/O circuit 13 is supplied to a digital signal processor 14, in which it is converted into the DAT format. The digital signal converted in accordance with the DAT format is supplied through a recording amplifier 15 and a recording side contact R of a recording/reproducing change-over switch 16 to the rotary heads A and B, and is thereby recorded on the tape 12.

When the signal recorded on the tape 12 is reproduced by the rotary heads A and B, the reproduced signal is supplied though a reproducing side contact P of the recording/reproducing change-over switch 16 and a playback amplifier 17 to the digital signal processor 14, in which the reproduced signal is reconverted into the digital data and then delivered through I/O circuit 13 to the outside.

An incoming control signal is also supplied to a system control circuit 18 of the DAT 1. On the basis of the signal from the system control circuit 18, the rotary head drum 11 is controlled to rotate, tape transport mechanism 19 to run the tape 12 and the recording/reproducing change-over switch 16 to change in position. Also, upon recording, the signal from the system control circuit 18 is supplied to the digital signal processor 14 which then produces a sub-code signal or the like which will be described later. Upon reproduction, the signal extracted by the digital signal processor 14 is supplied to the system control circuit 18, whereby the tracking control operation is made and a part of this signal is fed to the outside.

In this digital audio tape recorder 1 by connecting a DA (digital-to-analog)/ AD (analog-to-digital) converting circuit to the output of the I/O circuit 13 and a predetermined control apparatus to the output of the system control circuit 18, it is possible to record and/or reproduce, for example, an analog audio signal.

In the present invention, however, an interface bus 3 is connected through a controller 2 as an external apparatus to the digital audio tape recorder 1. The interface bus 3 may be of the type which conforms, for example, to the SCSI (small computer system interface) standard (see "NIKKEI ELECTRONICS", pp. 102 to 107, published by Nihon Keizai Shinbunsha on Oct. 6, 1986). A host computer 5 and a HDD (hard disc drive) 6 are connected to this interface bus 3 through a host adaptor 4.

In the above-mentioned controller 2, a protocol control circuit 21 is connected to the interface bus 3. Through the protocol control circuit 21, the data and the control signals are interchanged among a microcomputer 22 which controls the operation of the controller 2, a memory control or DMA (dynamic memory access) circuit 23 and the bus 3. The microcomputer 22 not only controls the operation of the controller 2 but also detects the address of the DMA circuit 23 and controls the operation of the DMA circuit 23. Also, data is interchanged between a buffer memory 24 and the interface bus 3 through the DMA circuit 23. Further, data is interchanged between the buffer memory 24 and the digital signal processor 14 provided in the DAT 1 via I/O circuits 25 and 13. In addition, the control signal is interchanged between the microcomputer 22 and the system control circuit 18.

Further, an error correcting code (ECC) generating circuit 26 is connected to the buffer memory 24 for generating the error correcting code for data stored in the buffer memory 24. The error correcting code generated from the generating circuit 26 is stored in a predetermined area of the buffer memory 24.

Accordingly, in this apparatus, data written in the hard disc drive 6 is supplied through the bus 3 to the controller 2 in response to the transfer request from the controller 2 during recording and is then written in the buffer memory 24 through the DMA circuit 23. The ECC generating circuit 26 generates the error correcting code for the data written in the buffer memory 24. Then, the data including the error correcting code is read out through the I/O circuit 25 and supplied to the I/O circuit 13 of the DAT 1. In the DAT 1, the data supplied from the I/O circuit 13 is regarded as being equivalent to data derived from an A/D converter when the audio signal is recorded. Then, the data is converted in accordance with the DAT format by the digital signal processing circuit 14 and recorded on the tape 12 by the heads A and B.

The error correcting code is generated upon recording as follows:

It is assumed that an error generating matrix is arranged for an arbitrary data sequence supplied to the DAT 1 as follows:

| 1 | ... | 1 | 1 | | 1 | 1 | 1 | 1 |
|---|---|---|---|---|---|---|---|---|
| $\alpha^{254}$ | ... | $\alpha^5$ | $\alpha^4$ | | $\alpha^3$ | $\alpha^2$ | $\alpha^1$ | 1 |
| $\alpha^{508}$ | ... | $\alpha^{10}$ | $\alpha^8$ | | $\alpha^6$ | $\alpha^4$ | $\alpha^2$ | 1 |
| $\alpha^{762}$ | ... | $\alpha^{15}$ | $\alpha^{12}$ | | $\alpha^9$ | $\alpha^6$ | $\alpha^3$ | 1 |
| | Data section | | | | | Parity section | | |

Figure 2:
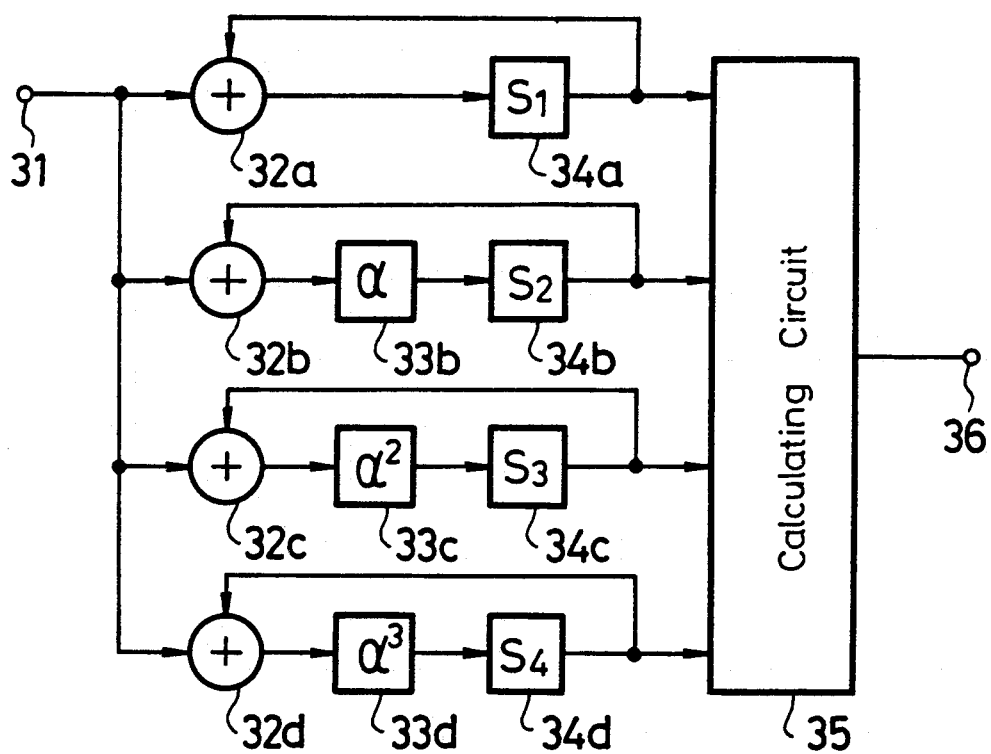
FIG. 2 is a circuit block diagram showing an example of a syndrome, generating circuit.

A syndrome generating circuit is formed for the matrix thus generated, for example, as shown in FIG. 2. Specifically, a data signal fed to a terminal 31 on the left side of the drawing is supplied to adder circuits 32a–32d. The output signals from the adder circuits 32a–32d are respectively supplied to syndrome registers 34a–34d directly and through coefficient circuits 33b–33d respectively having a coefficient of $\alpha$, $\alpha^2$ and $\alpha^3$. The signals outputted from the syndrome registers 34a–34d are respectively fed back to the adder circuits 32a–32d. Thus, syndromes are generated in the registers 34a–34d by the feedback which are effected every time the data signal is supplied to the adder circuits 32a–32d.

Therefore, every time the data signal is fed to the terminal 31, calculation is effected from the right side of the data section of the above matrix. Generally, at the time, for example, 251 symbols of data are supplied, the syndromes are generated from the registers 34a–34d. The syndromes thus generated are supplied to a calculating circuit 35, which corresponds to the parity section of the above matrix, to generate a 4-symbol error correcting code. If the data sequence is terminated while the calculation is progressing, the registers 34a–34d respectively generate the syndromes equivalent to the fact that zero is supplied to all the elements of the syndromes located on the left side from the point the calculation based on the data sequence has been effected. Then, at this time, the registers 34a–34d are made inoperative and the eespective contents thereof are supplied to the calculating circuit 35, to thereby generate the error correcting codes for the data which has been supplied to the syndrome generating circuit up to that time.

By this processing, the error correcting code can be smoothly generated and added to an arbitrarily variable length of data sequence. In this case, the above-mentioned syndrome generating circuit is realized in practice by software of a microcomputer or the like. The required hardware is solely memory areas corresponding to the syndrome registers 34a–34d so that the apparatus can be realized by a simple construction. That is, the memory capacity of each of the registers 34a–34d is four times the data amount for one track so that it will be understood that the syndrome generating circuit can be easily constructed with an extremely small memory capacity and a properly programmed microcomputer.

Figure 8:
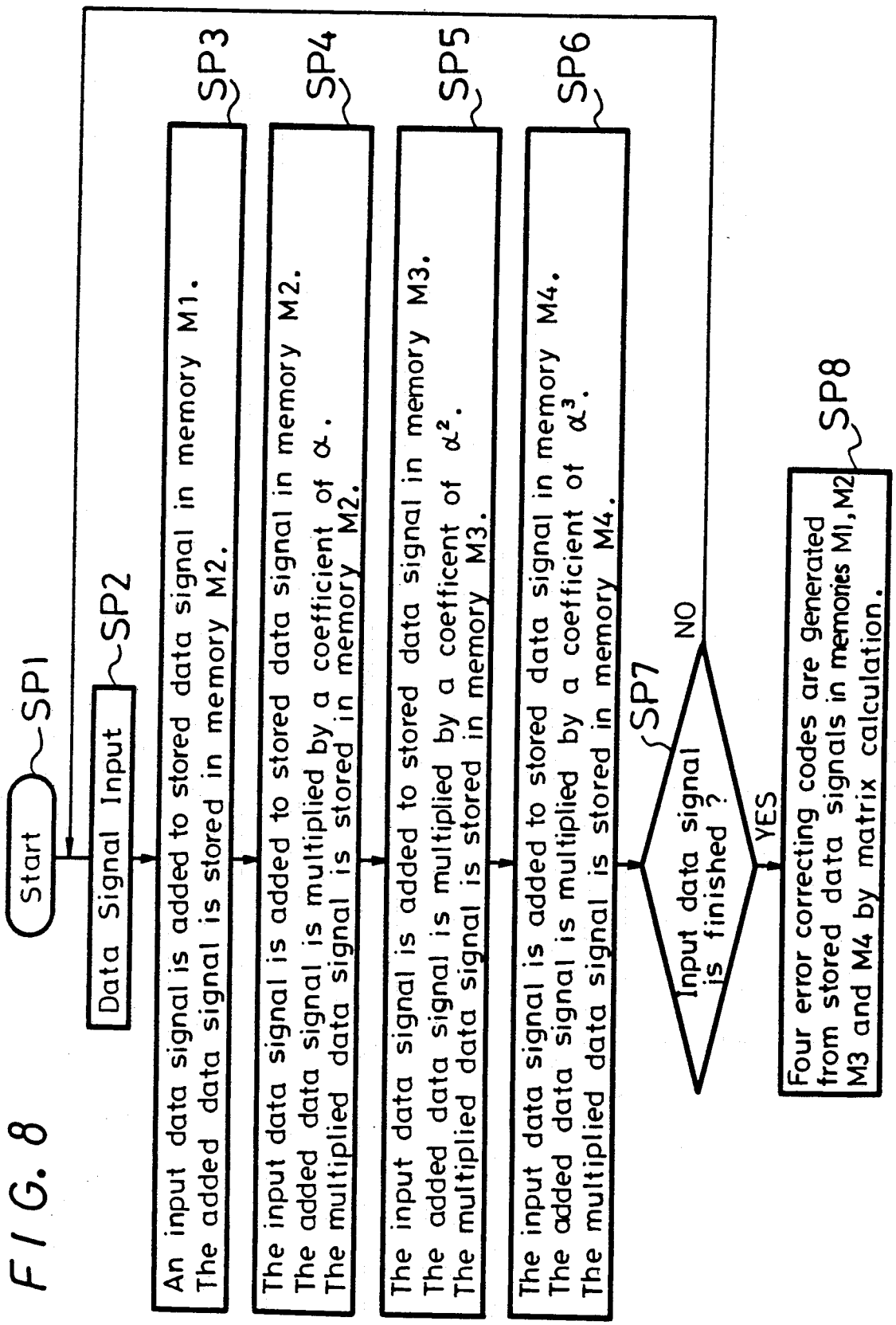
FIG. 8 is a flow chart illustrating a program for generating syndromes for use in error correction.

Referring now to FIG. 8, a flow chart for such a syndrome generating program is illustrated. The program starts at step SP1 and the data signal is input at step SP2. At step SP3, the input data signal is added to the stored data signal in memory M1 (within memory unit 24) and the added data signal is stored in memory area M2 of buffer memory 24.

The input data signal, at step SP4, is added to the stored data signal in the memory area M2. The added data signal is multiplied by a coefficient of $\alpha$. The multiplied data signal is stored in memory area M2. In step SP5, the input data signal is added to the stored data signal in memory area M3 of the buffer memory 24, the added data signal is multiplied by a coefficient of $\alpha^2$. The multiplied data signal is stored in memory area M3.

Next, the input data signal is added to the stored data signal in memory area M4 of the buffer memory area 24. The added data signal is multiplied by a coefficient of $\alpha^3$. The multiplied data signal is stored in memory area M4 at step SP6. At step SP7 it is determined whether or not the input data signal is finished. If the answer is no, the process returns to step SP2. If the answer is yes, the process goes to step SP8 where four error correcting codes are generated from the stored data signals in the memory areas M1, M2, M3 and M4 by matrix calculations. This ends the process.

The generated error correcting code is supplied to the DAT 1 subsequent to the data signals so as to smoothly record an arbitrarily variable length of the data signals, thereby rendering it possible to provide a satisfactory data recorder which employs the DAT.

In the above described embodiment, since two symbols are taken out from each frame of the data sequence for generating the error correcting code, the generated 4-symbol error correcting code can be recorded in two frames (four tracks).

If, as a particular example, the error correcting code is assumed to be formed of two symbols, the following matrix, for example, may be used:

$$\begin{array}{ccc|ccc} 1 & \ldots & 1 & 1 & 1 & 1 \\ \alpha^{254} & \ldots & \alpha^2 & \alpha & 0 & 1 \\ \hline \text{Data Section} & & & \text{Parity Section} & & \end{array}$$

With this matrix, the calculating circuit 35 becomes unnecessary.

Next, an explanation will be given of how error correcting processing is carried out during reproduction by the aforementioned apparatus with reference to FIGS. 1 and 3A to 3E.

Upon reproduction, the signal reproduced from the tape 12 by the heads A and B is reconverted by the digital signal processor 14 and thereby data corresponding to the audio signal is produced. This data is supplied through the I/O circuit 13 to the controller 2 which writes the data into the buffer memory 24. The data written in the buffer memory 24 through the I/O circuit 25 is read out through the DMA circuit 23 and then written in the hard disc drive 6 through the interface bus 3.

The data signals and the error correcting code (ECC) are reproduced as shown in FIG. 3A. If the DAT 1 detects that there is a frame whose error cannot be corrected as shown in FIG. 3B, direct output of data is halted as shown in FIG. 3C. However, at this time the data signals are continuously supplied to the syndrome generating circuit, so that the syndrome generating circuit generates data for correcting errors in the erroneous frame from the aforementioned DAT 1 at the time that the reproduction of the error correcting code has been terminated. The DAT 1 is instructed to rewind the tape as shown in FIG. 3D. Then, as shown in FIG. 3E the DAT resumes the reproduction of the data signals from the beginning thereof, in which the error correcting data generated by the syndrome generating circuit is inserted for the detected erroneous frame and then the whole data signals are reproduced.

When no error is found in the data frame, the data signals are reproduced without any processing and outputted to the interface bus 3. The above described processing is effected only when errors are found in the data frames, so that the data signals as a whole can be quite rapidly reproduced.

The above described error correction can be effected with only a small capacity of the memory area corresponding to the syndrome registers 34a-34d by using the data signals again reproduced from the DAT 1, without any necessity of providing a large capacity buffer memory for storing all data in the data section of the foregoing matrix and so on.

The error correction as described above requires, upon reproduction, detecting at least the frame number of the error correcting code and discriminating whether the frame contains the data signals or the error correcting code. Therefore, a signal area is reserved in the DAT format for such detection and discrimination. This DAT format, in accordance with which the data signals are recorded on the tape 12, will be explained with reference to FIG. 4.

Figure 4:
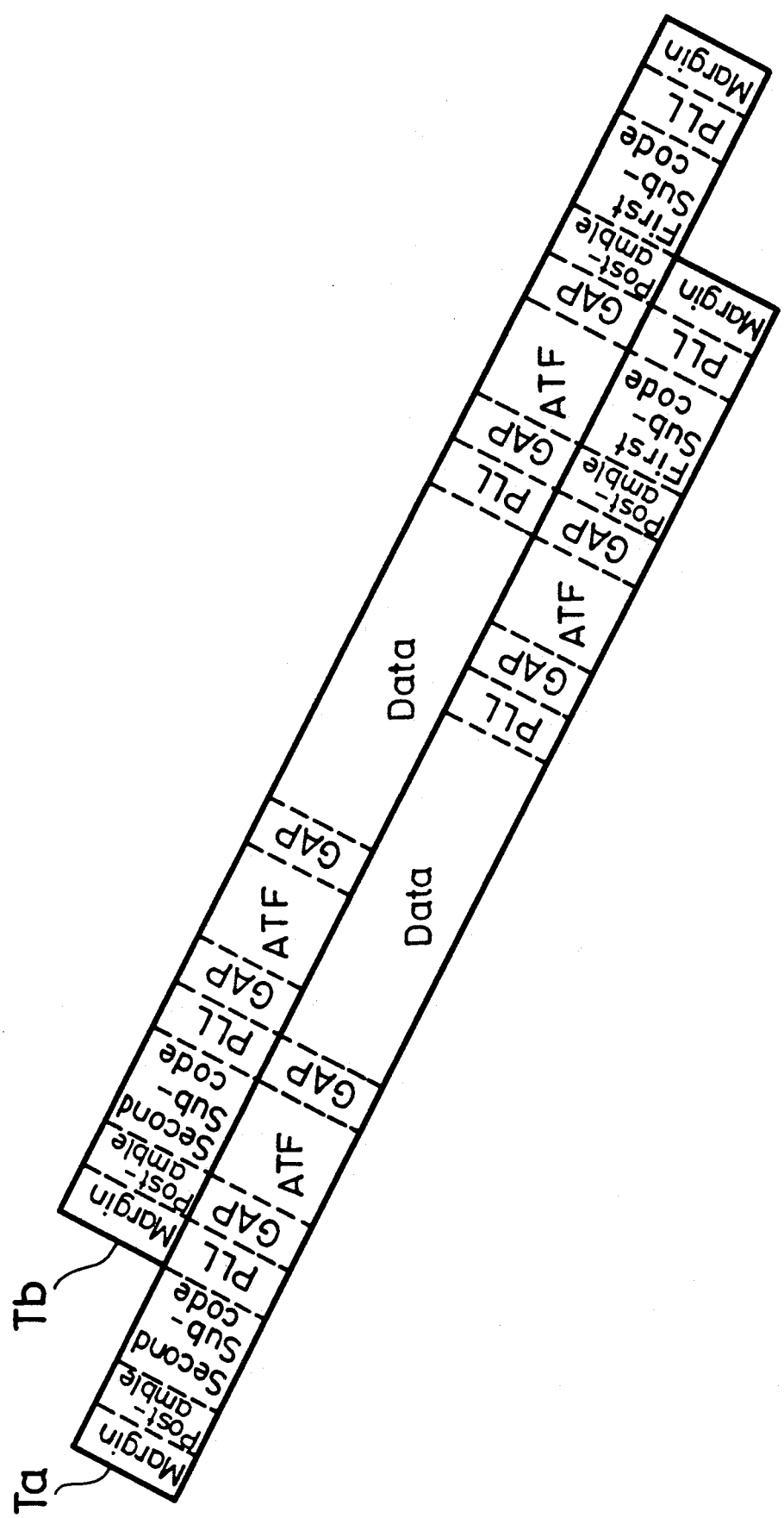
FIG. 4 is a diagram showing a DAT recording track format.

As can be seen from FIG. 4, one frame is made up of two tracks Ta and Tb formed by the eads A and B. Each of the tracks Ta and Tb has a length corresponding to the rotation of each of the respective heads through an angle of 90° and is partitioned from its lower end (i.e. from right to left in the figure) into 5.051° of a margin area, 0.918° of a preamble area for the PLL of the sub-code, 3.673° of a first sub-code, 0.459° of a postamble area, 1.378° of an interblock gap area, 2.296° of a tracking (ATF) signal area, 1.378° of an interblock gap area, 0.918° of a preamble area for the PLL of data, 58.776° of data area, 1.378° of an interblock gap area, 2.296° of an AFT signal area, 1.378° of an interblock gap area, 0.918° of a preamble area for the PLL of the sub-code, 3.673° of a second sub-code area, 0.459° of the postamble area, and 5.051° of the margin area. It should be noted that the scale of the respective areas in FIG. 4 is not exact.

Data fed to the DAT 1 at the I/O circuit 13 is supplied to the processing circuit 14 which adds predetermined error detecting and correcting codes and so on to the data and then inserts it into the data areas of the tracks Ta and Tb in accordance with a predetermined interleaving relationship.

As illustrated in FIG. 9A, the data area comprises an 8-bit synchronizing section at its starting portion and subsequently totals 16 bits of ID section formed of W1 and W2. The ID section is divided into eight ID areas of two bits. The first ID area (ID-0) is assigned to a format ID and set to "01" for a data specification, for example. The next ID area (ID-1) is assigned to a sub-category ID and set to "00" for a computer peripheral device, for example. The next ID area (ID-2) is assigned to a frame size ID and set to "00" when the recording capacity of the frame is 5760 bytes and "01" when the recording capacity of the same is 5292 bytes, for example. The ID area (ID-3) is assigned to a track pitch ID and set to "00" when the track pitch is 13.6 μm and "01" when the track pitch is 20.4 μm, for example.

As illustrated in FIG. 9B, the sub-code area also comprises an ID section formed of W1 and W2. The first bit of W1 is assigned to a code indicative of validity (set to "1") or invalidity (set to "0") of data. The next three bits of W1 are a code indicative of a location of an area including a frame. Specifically, this code is set to 37 000" when the area is located at a read-in area, that is, the beginning of a tape, "001" when in the data area, "010" when in a read-out area, that is, the end of a data recording area, "011" when at the end of medium, that is, the end of the tape. The remaining four bits of W1 is assigned to a code indicative of an ordinary frame (set to "00"), an amble frame used for synchronization or the like (set to "01"), a frame other than a file mark (set to "000*"), a first file mark (set to "001*"), a second file mark (set to "010*"), or a third file mark (set to "011*"). On the other hand, W2 has its first bit set to "1", the next three bits set to 37 000" which indicates that the following sub-code is a pack format, as will be later referred to, and the last four bits set to a value indicative of a block address.

A variety of determinations and so on are made by means of the above-mentioned information when the DAT 1 is used as a data recorder.

In the above apparatus, the data area is provided, for example, with 5760 bytes of a recording capacity per frame which is formatted as follows:

Referring to FIG. 5, the above-mentioned 5670 bytes are divided into words 0-1439 each formed of four bytes (32 bits). Each of the words are divided into an L-channel (left channel) and an R-channel (right channel) of 16 bits (2 bytes) each, in accordance with the DAT-formatted audio signal. The first three words (12 bytes) of the 5760 bytes are assigned to a synchronizing area in which all the bit of the first bytes are set to "1", and all the bits of the last byte are set to "0".

Next, eight words (32 bytes) are assigned to a header portion in which the same contents are written in the L-channel and R-channel portions. Specifically, explaining the arrangement of the header portion, the beginning half byte of the fourth word (note that the fourth word is referenced "3(−)," the fifth word is referenced "4(+)," etc.) is assigned to an area for indicating the condition of the frame in which the same frame ID, VF, and format ID as those in the sub-code area W1 and W2 are provided. The last half byte of the fourth word is assigned to a mode area which is set to "0000"-"0011" for CD-ROM and "1000" for DAT (in FIG. 5A no assignment code is shown).

The fifth word and the first half byte of the sixth word, together totaling 24 bits, are assigned to a logical frame number (LFNO) area in which a binary value indicative of the serial number of a valid frame from the top of each save set is stored. If an invalid frame is concerned, all bits of this area is set to "0".

The second half byte of the sixth word is assigned to an area indicative of a data condition. Specifically, the four bits at the LSB side thereof are assigned to a code (recording ID) area indicative of a recording type and set to "0000" representing Type 1 of streaming, "0001" representing Type 2 of streaming and "0010" representing Type 1 of start-stop. The next one bit is assigned to a flag (DH) indicative of whether the data in the header portion is also provided in the data signal supplied from the bus 3 (set to "1") or not (set to "0"). The remaining three bits at the MSB thereof are assigned to a binary-code combination indicative of the number (PFL) of error correcting code frames.

The first half byte of the seventh word is assigned to a binary-code combination indicative of the total number (ECFL) of data signal frames and error correcting code frames. If the number of the frames is not definite, this area is filled with "0". The second half byte of the seventh word is assigned to a binary-code combination indicative of the number (OWNO) of effected overwrite operations.

The first half byte of the eighth word is assigned a number (EFNO) which indicates whether the error correcting code has been added. When the first bit at the LSB side thereof is set to "0", it indicates that the concerned frame is a data signal frame. On the other hand, if the first bit is set to "1", it indicates that the concerned frame is an error correcting code frame and the subsequent seven bits thereof are set to a binary-code combination indicative of the serial number of that error correcting code frame, with the first error correcting code frame being designated by "1". If the error correcting code is not added to any frame, all of the bits are set to "0".

The second half byte of the eighth word and the first half byte of the ninth word are assigned to an area indicative of the number (EBL) of bytes of valid data contained in a frame and set to a binary-code combination indicative of the number of bytes.

The second half byte of the ninth word and the tenth and eleventh words are reserved as extended bits and are all set to "0" at the moment.

The subsequent 12th-1439th words are assigned to a data area which totals 5712 bytes and data signals from the bus 3 are sequentially recorded in these frames in four byte increments.

The 1440th word is assigned to a CRC area in which an error correcting code (CRC) is recorded for the data signals written in the header portion and the data area, i.e. the error correcting code generated for signals recorded on each of the tracks.

In the DAT format, the L-channel and R-channel data signals are alternately recorded on two adjacent tracks in two byte increments. These alternate tracks are generally identified, for example, by plus and minus (+ and −) azimuth angles of the heads for forming tracks which are marked on both sides of FIGS. 5A and 5B. Thus, the CRC is generated, for example, for the third word ($L_3$) of the L-channel, the fourth word ($R_4$) of the R-channel, $L_5$, $R_6$, $L_7$ .... in the minus (−) azimuth CRC area. On the other hand, in the plus (+) azimuth CRC area, the CRC is generated for $R_3$, $L_4$, $R_5$, $L_6$, $R_7$ ....

Therefore, according to this format, since the L-channel and R-channel of the header portion (the third-tenth words) have the same contents, that is, the data in the header portion is doubly recorded on the plus and minus azimuth tracks adjacent to each other, it is therefore possible to determine whether there remain unerased portions or not by comparing the contents of the header portion of the plus and minus azimuth tracks. The data in the OWNO area indicative of the number of the overwrite operation is rewritten every time the overwrite is effected. If one of the two adjacent plus azimuth and minus azimuth tracks of a given frame is not overwritten, for example, due to clogging occurring in one of the heads for recording signals on the track, data cannot be recorded and consequently the header data previously recorded on the unerased track is reproduced, so that the header content of the plus azimuth track is not coincident with the header content of the minus azimuth track. Also, the value in the logical frame number (LFNO) area of the plus azimuth track is different from that of the minus azimuth track when the overwrite has not been effected. It is therefore possible to judge whether or not an overwrite has failed by comparing these values in the plus azimuth and minus azimuth tracks of a given frame with each other. By thus picking up the frame in which data has not been overwritten as an error, it is possible to correct the error outside the DAT 1 with certainty.

Incidentally, the synchronizing area provided by the DAT format enables the DAT 1 to be freely synchronized with the controller 2, thereby favorably attending to variations in the amount of data contained in one frame. However, since the same pattern as the synchronizing pattern may appear in data signals, the data in the header portion and data and CRC areas should be scrambled, for example, by adding an M-sequence code or the like. Specifically, the controller 2 generates data to be written in the header portion for the data signal from the bus 3 and then generates the CRC from the data in the header portion. Then, the data and the CRC are scrambled, to which the synchronizing area is added, and then supplied to the DAT 1.

Further, it is appreciated that since in the above data format the CRC is added to each track, it is possible, outside of the DAT 1, to detect erroneous data in the tracks.

The data signal is formatted in accordance with the DAT rules as described above.

The above-mentioned apparatus allows 2048 bits of data to be recorded in the first and second sub-code areas. If the format for an audio signal is concerned, the 2048 bits of data is divided into packs each formed of 64 bits, in each of which is recorded information such as the time code, recording date and so on of the data recorded therein.

Thus, some of these packs may be assigned to record information on the data recorder. For example, two packs may be used to effect a variety of controls.

FIGS. 6A and 6B show an arrangement of the packs for this purpose. The 64 bits of each pack are divided into eight words of eight bits each. The four bits at the MSB side of the first word of each pack are assigned to an ITEM area, which is common to the audio signal recording format, and set to a four-bit binary-code combination indicative of the contents of the pack. However, nine of the total of 16 combinations which can possibly be made by four bits have already been determined for audio signal recording, so that the other combinations are arbitrarily selected from the remaining seven combinations for the data recorder. For example, "0001" is set to the ITEM area of the first pack, and "0010" to the ITEM area of the second pack.

The four bits at the LSB side of the first word and the second word are assigned to an area for indicating a frame condition in which are provided the format ID, area ID, VF and frame ID which are the same as those written in the aforementioned W1 and W2.

The third to fifth words of the first pack are assigned to a file number (FNO) area and are set to a binary-coded combination indicative of the serial number of a file within all of the files of data (set save) backed up at one time.

A total 16-bit area made up of the sixth and seventh words are assigned to a set save number (SSNO) area in which is recorded a binary-code combination indicating how many times the backup has been carried out from the initial use of the apparatus.

The eighth word of the first pack is assigned to a parity area for the first to seventh words.

A total 48-bit area made up of the third to fifth words of the second pack is assigned to an absolute frame number (AFNO) area in which is recorded a binary-coded combination indicative of the serial number of a frame from the head of the tape. The sixth and seventh words are reserved as extended bits and all set to "0" at the moment. The eighth word is assigned to a parity area for the first to seventh words.

Thus, the data signals can be quite smoothly reproduced by identifying these ID codes and so on as described above.

The information which can be formed in the controller 2 of the apparatus of the present embodiment is written in the header portion of the data area while the information which can be formed in the DAT 1 is written in the sub-code area.

Figure 7:
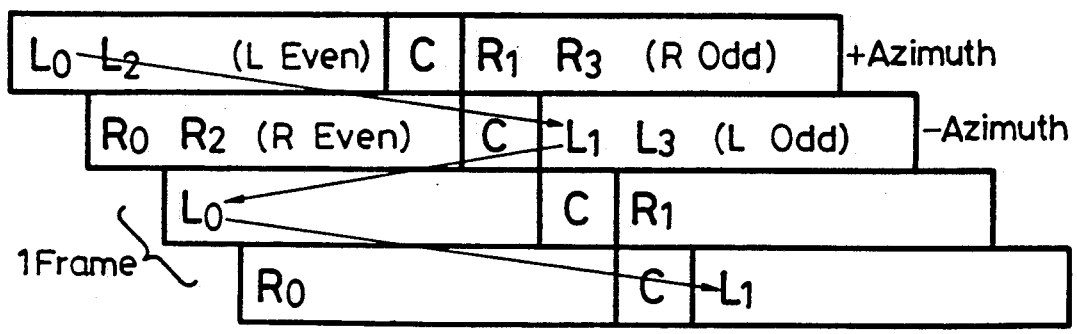
FIG. 7 is a diagram showing a recording pattern made in the main data area.

As shown in FIG. 7, the audio DAT format is such that one frame is made up of two oblique tracks formed by one rotation of the drum 11 and data is interleaved and recorded on the two tracks, wherein even-numbered data of the left channel is recorded in the first half of one (plus azimuth) track of the two tracks forming one frame, odd-numbered data of the right channel in the second half of the same, even-numbered data of the right channel in the first half of the other (minus azimuth) track and odd-numbered data of the left channel in the second half of the same. Reference letter "C" in the center of each track in FIG. 7 designates the error correcting code added to each track by the DAT 1.

As explained above, in addition to the error correcting code generated by the audio DAT, the data recorder is provided with an error correcting code generator 26 in the controller 2 for increasing the fidelity thereof. The error correcting code for interleaved data can be generated in the controller 2 by taking out 2n'th data (even-numbered) and 2n+1'th data (odd-numbered) of each frame to form a data sequence. With this additional error correcting code, the error correction can be effected by these two error correcting codes if the tape 12 is horizontally scratched or the like, thereby improving the error correcting ability in such cases.

According to the apparatus as described above, the DAT can be employed as a data recorder, wherein the drum 11 is rotated, for example, at 2000 rpm, so that data is quite rapidly recorded at a rate of 192,000 bytes per second and consequently the consumption of the recording medium can be largely reduced. Also, the data can be smoothly recorded by virtue of the error correcting code added thereto, which permits satisfactory data recording.

Further, since the data signal written in two tracks forming one frame in accordance with the DAT format is provided with means for determining continuity of the tracks, it is possible to easily detect unerased signals due to clogging of the head and so on, whereby a satisfactory data recorder employing the DAT can be provided.

Moreover, since the header portion of the data area is recorded in both the plus azimuth and the minus azimuth tracks forming a frame, it is possible to easily detect and correct previously recorded data signals which have not been overwritten, by detecting whether or not the header portions of these tracks contain the same data, thereby providing a data recorder with a high fidelity.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A method of recording digital data signals in a main data area in a series of track pairs on a recording medium comprising the steps of;
    receiving digital information signals from an external source and dividing them into frames, each frame corresponding to a different pair of tracks to be recorded on the recording medium;
    for each of the two tracks forming each frame, generating header portions, having identical contents, which are each arranged to be recorded before the digital information signals in the respective tracks; and recording the digital information signals and the header portions in the main data area in a series of pairs of tracks on the recording medium according to a predetermined, digital audio tape recorder (DAT) format.

2. A method for recording digital data signals on a recording medium as claimed in claim 1, wherein the header portion generating step additionally comprises generated a header portion which includes a signal indicative of the total number of error correcting code frames and data signal frames.

3. A method for recording digital data signals on a recording medium as claimed in claim 1, wherein the header portion generating step additionally comprises generating a header portion which includes a signal indicating the number of times the track to which the header is assigned has been rerecorded with digital data signals.

4. A method for recording digital data signals on a recording medium as claimed in claim 1, wherein the header portion generating step additionally comprises generating a header portion which includes a signal indicative of the number of bytes of valid data contained in the frame to which the header is assigned.

5. A method of recording digital data on a recording medium as claimed in claim 1, wherein said header portion providing step additionally comprises providing a frame number which varies in accordance with each frame.

6. A method of recording digital data signals on a recording medium as claimed in claim 1, wherein said header portion providing step additionally comprises providing an ID signal indicative of a data format.

7. A method of recording digital data signals in a main data area and sub code data in a sub data area in a series of track pairs on a recording medium comprising the steps of:

receiving digital information signals from an external source and dividing them into frames, each frame corresponding to a different pair of tracks to be recorded on the recording medium;

for each of the two tracks forming each frame, generating header portions, having identical contents, which are each arranged to be recorded before the digital information signals in the respective tracks;

for each of the two tracks forming each frame, generating sub code data; and recording different digital information signals and the identical header portions in the main data area and the sub code data in the sub data area in a series of pairs of tracks on the recording medium according to a predetermined digital audio tape recorder (DAT) format.

8. An method for recording digital data signals as recited in claim 7, wherein each header portion includes a signal indicative of the type of source of the digital data signals.

9. An apparatus for recording digital data signals in a main data area in a series of track pairs on a recording medium comprising:

means for receiving digital information signals from an external source and dividing them into frames, each frame corresponding to a different pair of tracks to be recorded on the recording medium;

means for generating header portions for each of the two tracks forming each frame, the header portions having identical contents and each arranged to be recorded before the digital information signals in the respective tracks; and means for recording the digital information signals and the header portions in the main data area in a series of pairs of tracks on the recording medium according to a predetermined digital audio tape recorder (DAT) format.

10. An apparatus for recording digital data signals on a recording medium as claimed in claim 9, wherein the received digital data signals are formatted into frames containing error correcting code and frames containing information data and wherein the header portion generating means further generates a header portion which includes a signal indicative of the total number of error correcting code frames and information data frames.

11. An apparatus for recording digital data signals on a recording medium as claimed in claim 9, wherein the header portion generating means further generates a header portion which includes a signal indicating the number of times the track to which the header is assigned has been rerecorded with digital data signals by the recording means.

12. An apparatus for recording digital data signals on a recording medium as claimed in claim 9, wherein the header portion generating means further generates a header portion which includes a signal indicative of the number of bytes of valid data contained in the frame to which the header is assigned.

13. An apparatus for recording digital data signals on a recording medium as claimed in claim 9, wherein the header portion generating means further generates a header portion which includes a logical frame number signal indicative of the serial number of a valid frame from the top of each save set.

14. An apparatus for recording digital data signals on a recording medium as claimed in claim 9, wherein the incoming digital data signals comprises data words of a right channel and a left channel and wherein the header portion corresponds to a part of the data words of the right and left channels and wherein the recording means includes at least two rotary heads for recording the identical contents of the header portions.

15. An apparatus for recording digital data signals on a recording medium as claimed in claim 9, wherein the header portion providing means further provides a header portion which includes a frame number which varies in accordance with each frame.

16. An apparatus for recording digital data signals on a recording medium as claimed in claim 9, wherein the header portion providing means provides a header portion which includes an ID signal indicative of a data format.

17. A method of reproducing digital data signals recorded on a recording medium, wherein the digital data signals as recorded are formatted into frames, each frame corresponding to two tracks, with an identical header portion being provided at the beginning of each track forming one frame, it being intended that the digital data nd the header portions of each frame are to be reproduced together, the method comprising the steps of:

reproducing the digital data signals recorded in the tracks on the recording medium;

separating the header portions from the reproduced digital data signals and comparing with each other at least parts of the header portions reproduced from the two tracks forming each frame;

determining that the digital data signals written in each frame are erroneous if the data in the parts of the header portions of the two tracks are not identical; and correcting the erroneous digital data signals of each frame by the use of an error correcting code.

18. An apparatus for reproducing digital data signals recorded on a recording medium wherein the recorded digital data signals are formatted by being divided into frame, each of which corresponds to two tracks, with each frame including a header portion which is identical in the respective two tracks forming each frame, comprising:

means for reproducing the digital data signals recorded in the tracks on the recording medium;

separating and comparing means for separating the header portions from the reproduced signals for each frame and comparing at least parts of the header portions reproduced from the two tracks forming each frame with each other;

means supplied with the results of the separating and comparing means for determining whether the digital data signals written in each frame are erroneous if the comparison result shows that data in the parts of the header portions of the two tracks are not identical; and error correcting means for correcting the erroneous digital data signals by the use of an error correcting code.

19. An apparatus for recording digital data signals in a main data area and sub code signals in a sub data area in a series of track pairs on a recording medium comprising:

means for receiving digital information signals from an external source and dividing them into frames, each frame corresponding to a different pair of tracks to be recorded on the recording medium;

means for generating header portions for each of the two tracks forming each frame, the header portions having identical contents and each arranged to be recorded before the digital information signals in the respective tracks;

means for generating sub code data for each of the two tracks forming each frame; and means for recording different digital information signals and the identical header portions in the main data area and the sub code signals in the sub data area in a series of pairs of tracks on the recording medium according to a predetermined digital audio tape recorder (DAT) format.

20. An apparatus for recording digital data signals as recited in claim 19, wherein the means for generating each header portion generates as a part of the header a signal indicative of the type of source of the digital data signals.

* * * * *